W. A. ALLEN.
TIRE PRESSURE GAGE.
APPLICATION FILED MAR. 3, 1911. RENEWED SEPT. 18, 1919.

1,370,678.

Patented Mar. 8, 1921.

WITNESSES:

INVENTOR
William A. Allen
BY
Howson and Howson
his ATTORNEYS

UNITED STATES PATENT OFFICE.

WILLIAM A. ALLEN, OF YONKERS, NEW YORK, ASSIGNOR TO A. SCHRADER'S SON, INCORPORATED, OF NEW YORK, N. Y., A CORPORATION OF NEW YORK.

TIRE-PRESSURE GAGE.

1,370,678.         Specification of Letters Patent.         Patented Mar. 8, 1921.

Application filed March 3, 1911, Serial No. 612,007. Renewed September 18, 1919. Serial No. 324,574.

*To all whom it may concern:*

Be it known that I, WILLIAM A. ALLEN, a citizen of the United States of America, residing in the city of Yonkers, in the county of Westchester, in the State of New York, have invented certain new and useful Improvements in Tire-Pressure Gages, of which the following is a specification.

My invention relates to pressure gages, more particularly such as are intended for testing air pressure in the pneumatic tires of automobile wheels and the like, and the object of my invention is to provide a suitable indicating device therefor, particularly one which will move outwardly with the pressure piston and remain in indicating position while the piston returns to normal position.

In the accompanying drawing—

As shown, the gage comprises an outer tubular case A, the internal tubular piston B, and the helical pull spring D, connecting the upper closed end of the piston B with the lower end of the outer case A. As a convenient means of connecting the ends of the spring to these parts, I provide a cross-pin $d$ passing through a transverse opening in the piston head $b$ and a loop at the corresponding end of the spring, while a pin $d^1$ passes through a loop at the other end of the spring and bears against the lower end of the case A, Fig. 2. A ferrule $a$ screwed onto the lower end of the case A carrying a nipple plate E helps to hold the pin $d^1$ in place. The nipple part $e$ of the plate E has an opening $e^1$ for the admission of air to the inner or underside of the piston, when on application of the device to the tire nipple, the surrounding rubber gasket or other yielding packing F has been pushed back, and the tire valve then opened by the nipple part of the plate E.

Figure 2:
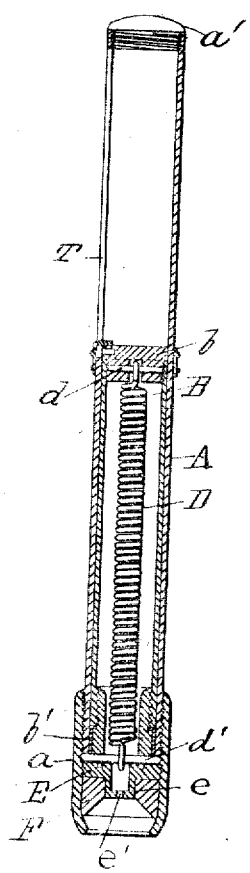
Fig. 2 is a vertical section thereof.
Figure 1:
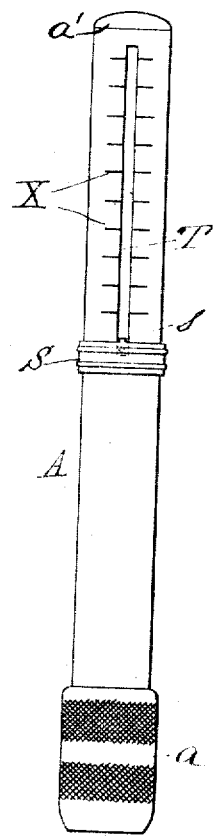
Figure 1 is a side elevation of a gage to which my invention has been applied in one form.
Figure 3:
Fig. 3 is a perspective of the indicating band or ring.

The upper end of the tubular piston B is closed by a plug or head $b$, while the lower end may have an external cupped packing $b^1$, Fig. 2, to make a close sliding fit within the case A. The outer case is nearly twice as long as the piston, so as to inclose the latter in all its positions and its upper end is closed by a cap $a^1$.

My improved indicating device comprises a gage member slidable on the exterior of the casing and having a portion adapted to be engaged by the piston when the latter is moved outwardly, the piston being adapted to return to normal position independently of said member. In the form shown, this member comprises a spring clip or sleeve S which slides over the graduations X on the exterior of the casing A. Rigid with the clip S I provide a lug $s$ turned down into the longitudinal slot T in the upper portion of the casing A, and lying in the path of the head $b$ of the piston B, so that as the latter moves outwardly the lug $s$ on the clip S is engaged thereby and the sleeve correspondingly displaced. Upon the removal of the gage from the tire valve the piston at once sinks, but the clip S, by reason of its frictional engagement with the exterior of the casing, remains in the position on the scale X to which it has been forced out by the piston. The tire pressure may thus be read at leisure or in a more convenient spot than that at which it may have been necessary to apply the gage. After the record has been noted, the clip S may be moved down to normal position by simply sliding it down over the casing until the lug $s$ impinges against the bottom of the slot T in the casing.

I do not herein claim broadly a pneumatic tire gage having a means of quick application to a tire valve and an indicator which remains in its indicating position by friction or otherwise after the gage is removed from the tire valve, since this is the invention of others.

Obviously my invention may be embodied in other forms of construction than that illustrated, and I do not limit myself thereto, but claim—

1. A gage for pneumatic tires comprising a casing, a tubular piston within said casing, a helical-spring attached at one end to said piston and at the other end to a fixed part of the casing, said tubular piston having a recessed head, and a pin passing through said head and recess and adapted to attach the end of said spring to the piston.

2. A gage for pneumatic tires comprising a casing, separable parts including a ferrule at the tire-valve-engaging end of said casing, a tubular piston within said casing, a helical-spring attached at one end to said piston, and a pin fastened between the end of said casing and said separable parts to which the other end of said spring is attached.

3. A pressure gage for pneumatic tires comprising a single casing having a longitudinal slot therein for a portion of its length, a spring-resisted tubular piston within said casing, said piston having a packing means at its lower end, said piston being adapted to move into that part of the casing having the longitudinal slot, the packing means of the piston maintaining a tight connection with the unslotted part of the casing, and a spring, said spring being inside of the tubular piston, and an indicator frictionally mounted on the outer portion of the casing said indicator being disconnected from the piston and having means projecting through the longitudinal slot in the cylinder whereby said indicator may be actuated by the movements of the tubular piston and left in registering position when the piston is withdrawn by the action of the spring.

4. A gage for pneumatic tires comprising a tubular casing, said casing having a portion with closed walls and a portion with an opening therein, a tubular piston arranged within the casing, and having the upper end closed and adapted to extend within said portion of the casing provided with said opening upon pressure being exerted against its pressure face, said closed portion of the casing serving as a cylinder for said piston, and a spring being normally housed within said tubular piston, said opening serving for the purpose of determining the position of said piston within said casing.

5. A gage for pneumatic tires comprising a tubular casing, said casing having a portion with closed walls and a portion with an opening therein, a tubular piston arranged within the casing, and having the upper end closed and adapted to extend within said portion of the casing provided with said opening upon pressure being exerted against its pressure face, said closed portion of the casing serving as a cylinder for said piston, and a spring being normally housed within said tubular piston, said opening serving for the purpose of determining the position of said piston within said casing, and said piston having a packing at its lower end.

In testimony whereof I have signed my name to this specification, in the presence of two subscribing witnesses.

WILLIAM A. ALLEN.

Witnesses:
GEORGE A. OVENS,
E. GRUENING.